(12) United States Patent
Dorrance et al.

(10) Patent No.: US 7,302,093 B2
(45) Date of Patent: Nov. 27, 2007

(54) COLOR VISION VEHICLE WHEEL ALIGNMENT SYSTEM

(75) Inventors: Daniel R. Dorrance, Ballwin, MO (US); David A. Voeller, St. Louis, MO (US); Timothy A. Strege, Ballwin, MO (US); Thomas Golab, St. Peters, MO (US); Leigh R. Burns, Jr., Troy, IL (US)

(73) Assignee: Hunter Engineering Company, Bridgeton, MO (US)

( * ) Notice: Subject to any disclaimer, the term of this patent is extended or adjusted under 35 U.S.C. 154(b) by 780 days.

(21) Appl. No.: 10/397,345

(22) Filed: Mar. 26, 2003

(65) Prior Publication Data

US 2003/0187610 A1 Oct. 2, 2003

Related U.S. Application Data

(60) Provisional application No. 60/367,966, filed on Mar. 26, 2002.

(51) Int. Cl.
*G06K 9/00* (2006.01)
(52) U.S. Cl. .................................... 382/162
(58) Field of Classification Search ............ 382/162, 382/141; 33/203, 13–17
See application file for complete search history.

(56) References Cited

U.S. PATENT DOCUMENTS

| | | | |
|---|---|---|---|
| 5,535,522 A | 7/1996 | Jackson | |
| 5,724,743 A | 3/1998 | Jackson | |
| 5,809,658 A | 9/1998 | Jackson et al. | |
| 5,870,315 A | 2/1999 | January | |
| 5,943,783 A | 8/1999 | Jackson | |
| 5,965,875 A | 10/1999 | Merrill | |
| 5,969,246 A | 10/1999 | Jackson et al. | |
| 6,064,750 A | 5/2000 | January et al. | |
| 6,134,792 A | 10/2000 | January | |
| 6,148,528 A | 11/2000 | Jackson | |
| 6,243,204 B1 | 6/2001 | Bradley, Jr. et al. | |
| 6,298,284 B1 | 10/2001 | Burns, Jr. et al. | |
| 6,323,776 B1 | 11/2001 | Jackson et al. | |
| 6,412,183 B1 | 7/2002 | Uno | |
| 6,509,962 B1 | 1/2003 | Burns, Jr. | |
| 6,526,665 B2 | 3/2003 | Jackson | |
| 6,594,600 B1 * | 7/2003 | Arnoul et al. ................ 702/94 |
| 6,839,972 B2 * | 1/2005 | Jackson et al. ............... 33/286 |
| 2002/0027651 A1 | 3/2002 | Jackson et al. | |
| 2002/0189115 A1 | 12/2002 | Jackson et al. | |
| 2003/0023395 A1 | 1/2003 | O'Mahony et al. | |
| 2003/0051356 A1 | 3/2003 | Jackson et al. | |

* cited by examiner

*Primary Examiner*—Wenpeng Chen
*Assistant Examiner*—Yuzhen Ge
(74) *Attorney, Agent, or Firm*—Polster, Lieder, Woodruff & Lucchesi, L.C.

(57) ABSTRACT

An improved computer controlled optical imaging vehicle wheel alignment system configured to obtain one or more color images of optical targets associated with a vehicle, and to process the color images to obtain vehicle wheel alignment measurements.

7 Claims, 7 Drawing Sheets

COLOR VISION VEHICLE WHEEL ALIGNMENT SYSTEM

CROSS-REFERENCE TO RELATED APPLICATIONS

The present invention relates to, and claims priority from, now abandoned U.S. Provisional Patent Application No. 60/367,966 filed on Mar. 26, 2002.

STATEMENT REGARDING FEDERALLY SPONSORED RESEARCH

Not Applicable.

BACKGROUND OF THE INVENTION

The present invention relates to machine vision vehicle wheel alignment systems adapted with cameras to view optical targets mounted to the wheels of a motor vehicle for purposes of obtaining grayscale or monochromatic images thereof, and for determining vehicle wheel positions and orientations, and more particularly, to an improved machine vision vehicle wheel alignment system utilizing one or more cameras that are sensitive to multiple colors, such as red, blue, and green light to view and obtain images of optical targets associated with a motor vehicle.

Traditional vehicle wheel alignment systems utilizing optical imaging systems, such as cameras, to view and obtain images of optical targets mounted to vehicle wheels, employ grayscale or single-color, monochromatic imaging systems. These traditional vehicle wheel alignment systems utilize cameras or optical imaging systems which are sensitive only to an intensity of received light or to light of a specific wavelength. Such systems, while effective, are incapable of utilizing multiple colors to extract additional information from the images obtained by the camera or optical imaging system.

Figure 1:
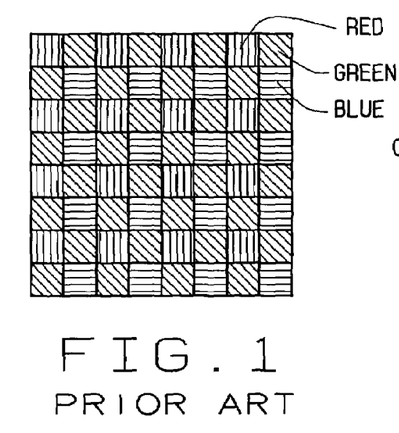
FIG. 1 is a representation of a prior art Bayer Red-Green-Blue (RGB) color filter.
Figure 2:
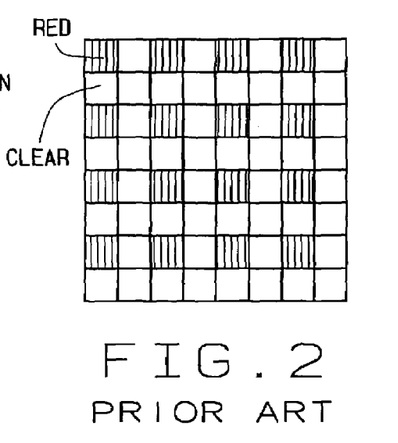
FIG. 2 is a representation of a prior art red color plane for the filter of FIG. 1.
Figure 3:
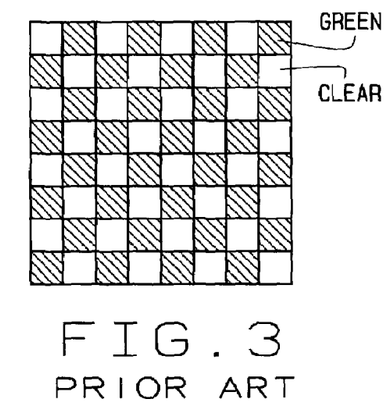
FIG. 3 is a representation of a prior art green color plane for the filter of FIG. 1.
Figure 4:
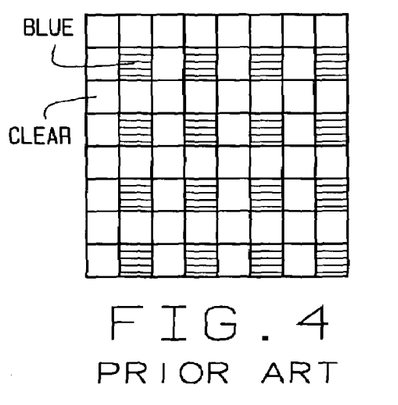
FIG. 4 is a representation of a prior art blue color plane for the filter of FIG. 1.

The majority of traditional cameras and color imagers which are sensitive to colored light use a Bayer pattern mosaic color filter on top of a CMOS sensor or CCD active area. The Bayer color filter is aligned such that a single pixel site on either the CMOS sensor or CCD active area will receive, and accordingly, be sensitive to only one color of light. The Bayer color filter is arranged such that adjacent pixels receive, and are sensitive to, different colors. A typical red, green, blue (RGB) Bayer color filter is shown in FIG. 1. The individual color planes of the Bayer RGB color filter shown in FIG. 1 are set out in FIG. 2 through FIG. 4. Within each color plane of the Bayer color filter, only selected colors of light are permitted to pass through the filter regions, falling on underlying light sensitive pixels elements. The vertical stacking of the multiple color planes shown in FIGS. 2-4 provides for a complete filtering of all light reaching the underlying light sensitive pixels, as is shown in FIG. 1.

To determine multiple color values for each pixel in an image, cameras that employ a color filter such as a Bayer color filter arrangement utilize a complex color interpolation scheme to estimate a red, green, blue (RGB) value for each pixel. The estimated RGB values are based, in-part, upon the filtered colored light received at each adjacent pixel.

Accordingly, it would be highly advantageous to develop a vehicle service system capable of capturing and utilizing multi-color images of color optical targets associated with a vehicle undergoing testing and repair. It would be further advantageous to utilize color target elements to obtain a high degree of precision in the measurement of a detected image, thereby providing a correspondingly high degree of resolution and accuracy in the resulting vehicle measurements.

BRIEF SUMMARY OF THE INVENTION

Briefly, in a first aspect of the present invention, an apparatus for determining the alignment of a wheel of a vehicle includes an optical target associated with a wheel of the vehicle. The optical target includes a plurality of optical elements. A color camera or color imaging system is provided for obtaining at least one image containing at least one optical target. Output from the color camera or color imaging system is provided to a processor configured to identify, from the image of the optical target, the characteristics in the image of the optical elements and for determining from the estimates of the characteristics, one or more alignment measurements of the wheel.

In a second aspect of the present invention, a method for determining the alignment of a wheel of a vehicle includes the initial step of associating an optical target having one or more optical elements with the wheel. The method further includes the step of obtaining at least one color image containing at least one optical target, and determining from the at least one color image containing at least one optical target, the characteristics in the color image of the optical elements of the at least one optical target. One or more wheel alignment values are subsequently computed from the determined optical element characteristics.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

For purposes of this specification, the following definitions are provided:

Color is any of a manifold phenomena of light, i.e. electromagnetic radiation, (such as red, brown, pink, yellow, green, blue, infrared, ultraviolet, etc.).

White is a combination of all wavelengths of light in the visible spectrum. White light has some energy in nearly every part of the visible spectrum. Pure white is a white in which all wavelengths are equally represented, such that no one wavelength is dominant.

Black is the absence of color.

Hue is the attribute of colors that permits them to be classed as red, yellow, green, blue, or an intermediate between any contiguous pair of these. A color hue is contrasted to black, white, or gray.

Tone is the color that appreciably modifies a hue, white, or black.

Monochromatic is consisting of a single color or hue.

Achromatic is consisting of no hue.

Grayscale refers to shades of gray ranging between black and white which are considered achromatic.

Figure 5:
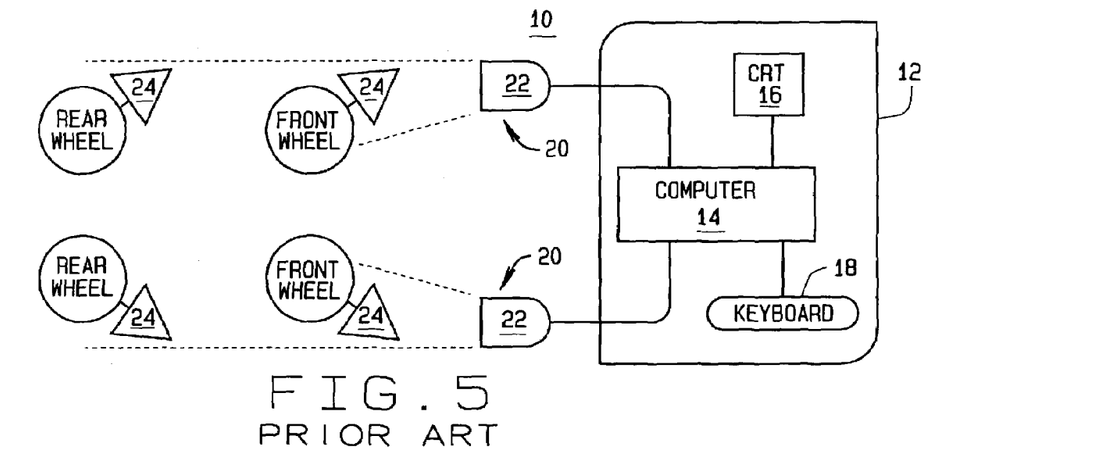
FIG. 5 is a block diagram of a prior art wheel alignment imaging system.
Figure 6:
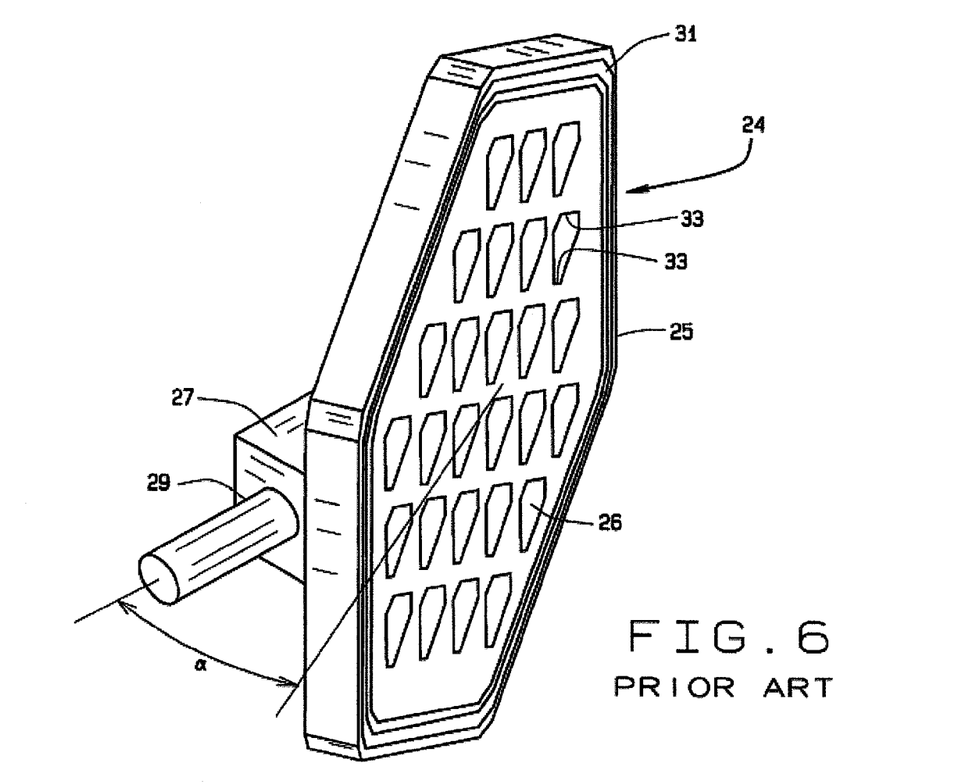
FIG. 6 is a representation of a prior art optical target.

It is preferred that the present invention be embodied as an improvement to a computer controlled optical imaging vehicle wheel alignment system, shown generally in FIG. 5 at 10, such as is set forth and described in U.S. Pat. No. 5,675,515 to January, and U.S. Pat. No. 6,298,284 B1 to Burns, Jr. et al., each herein incorporated by reference. The optical imaging vehicle wheel alignment system 10 consists generally of a console 12 having a computer or microprocessor 14, one or more display devices 16, such as a monitor, and one or more input devices 18, such as a keyboard. The computer or microprocessor 14 is configured with one or more software applications, at least one of which is adapted to facilitate the alignment of vehicle wheels, using input received from one or more sensors 20. In an optical imaging vehicle wheel alignment system 10, the sensors 20 preferably include a monochromatic or grayscale camera system or imaging system 22 configured to view one or more optical targets 24 having black and white optical elements 26, to obtain images thereof for processing by the software application. Exemplary conventional optical targets 24 are shown in FIG. 6, and are set forth and described in U.S. Pat. No. 6,064,750 to January, and U.S. Pat. No. 6,134,792 to January, each herein incorporated by reference. Each optical target 24 consists of a target face 25, on which are disposed the optical elements 26, a base 27, and a mounting shaft 29. An exemplary computer controlled optical imaging vehicle wheel alignment system 10 is the Series 611 Wheel Alignment System utilizing the DSP 400 Series sensors, manufactured and sold by Hunter Engineering Company of Bridgeton, Mo.

Figure 7:
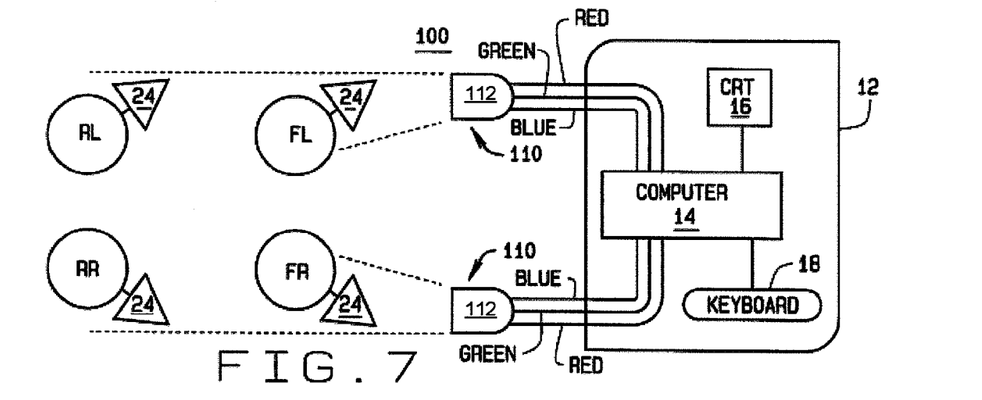
FIG. 7 is a block diagram of a wheel alignment imaging system of the present invention configured with color cameras.

As will be discussed in more detail presently, the present invention consists generally of an improvement to an optical imaging vehicle wheel alignment system 10. Turning to FIG. 7, a camera system or imaging system 110 of the present invention, adapted for use with an optical imaging vehicle wheel alignment system 100, consists of at least one color imaging device or color camera 112 which is configured to view one or more optical targets 24. For purposes of obtaining vehicle wheel alignment measurements, the optical targets 24 are generally associated with individual wheels of a vehicle, however, those of ordinary skill in the art will recognize that the optical targets 24 may be associated with other vehicle components or with vehicle support structures, such as lift racks, to obtain associated positional information.

Figure 8:
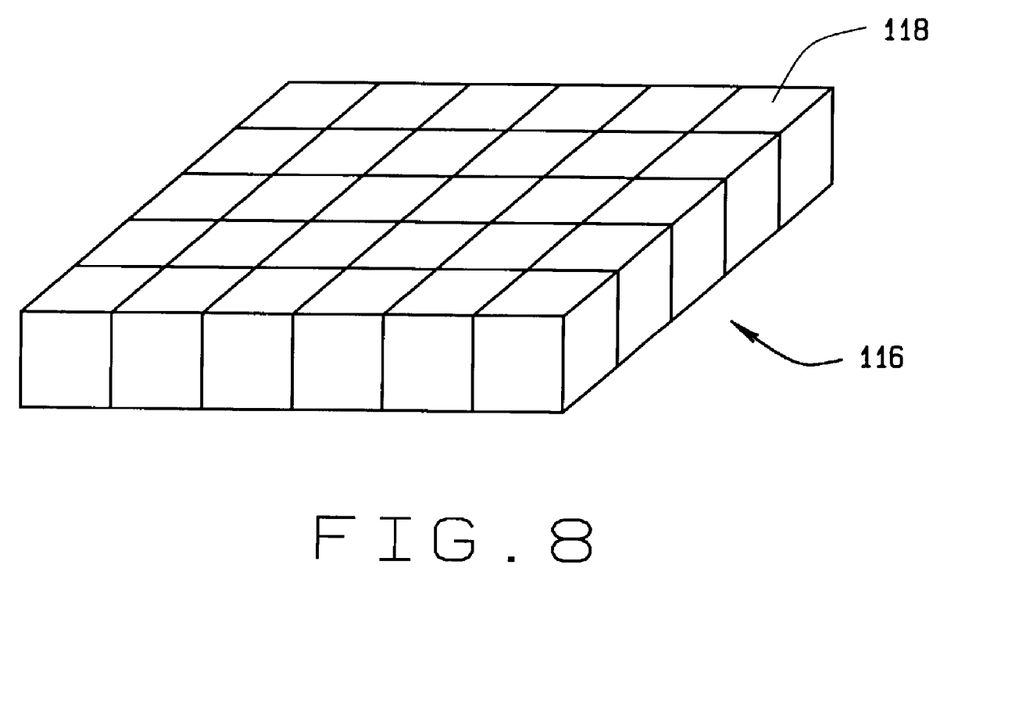
FIG. 8 is a simplified representation of a prior art imaging device, illustrating discrete imaging elements.

Preferably, the color imaging device or color camera 112 utilizes at least one imaging component, such as a CMOS image sensor or a CCD sensor 116, shown in FIG. 8, and associated circuitry, as described generally in U.S. Pat. No. 6,509,962 B1 to Burns, Jr., herein incorporated by reference. The sensor 116 includes a plurality of discrete light-sensitive pixel locations 118, and is capable of detecting two or more colors, as distinguished from a monochromatic or grayscale imaging device or camera 22. The color camera 112 may be configured to detect multiple colors at each pixel location 118, such as disclosed in U.S. Pat. No. 5,965,875 to Merrill, herein incorporated by reference, or may utilize a conventional Color Filter Array (CFA) such as the Bayer filter color capture technology to interpolate multiple colors at each pixel location 118. Those of ordinary skill in the art will recognize that most methods for processing color images require a separate camera lens calibration for each distinct color (i.e. red, green and blue) to which the sensor 116 is sensitive, as well as a combined calibration, since a camera lens will have different variations for each wavelength of light.

Preferably, the output from the color camera 112 includes a discrete output channel corresponding to each discrete color to which the color camera 112 is responsive, as is conventional in the design of color camera systems. For example, if the color camera 112 is sensitive to receive or interpolate red, green, and blue light levels at each pixel location, the output will include a red channel, a green channel, and a blue channel, with each channel carrying corresponding light levels for each pixel location 118 in a captured image. Each output channel is coupled to the computer 14, as shown in FIG. 3.

In a first embodiment of the present invention, one or more color cameras 112 are utilized to obtain one or more images containing one or more conventional optical targets 24 having black and white optical elements 26. At least one optical target 24 is disposed in a field of view of a color camera 112, and associated with a vehicle component, such as a vehicle wheel. The one or more images containing the one or more optical target 24 obtained by the color camera 112 are communicated to the computer 14 associated with the wheel alignment system 10, and processed in a conventional manner to extract information related to the associated vehicle components, such as vehicle wheel alignment measurements. With a conventional optical target 24, the optical elements 26 are black and white, hence, the computer 14 may utilize only one color channel of input received from the color camera 112, or alternatively, may utilize conventional color image processing algorithms to combine the input from each color channel to construct a grayscale or monochromatic image of the optical target 24 for processing.

Using a conventional optical target 24, the computer 14 can process a color image containing one or more optical targets 24 as multiple separate images, one for each color input channel (i.e., red, green, and blue). This yields multiple sets of optical target reference points which improves the repeatability and accuracy of the target image measurements. This further improves the speed of image acquisition for color cameras 120 using image sensors 116 where image noise levels (as in CMOS sensors) require the combination of several image frames to yield a clean image. An image of a conventional optical target 24 is recorded on three color channels, effectively yielding three optical targets per image. Optionally, the targets from each color channel could be combined in a single composite image to produce a reduced noise representation of the optical target.

In an alternate embodiment of the present invention, color is utilized as a means to distinguish between multiple color optical targets 120 in a field of view of the color camera 112. For example, to distinguish between color optical targets 120F associated with front wheels of a vehicle, and color optical targets 120R associated with rear wheels of a vehicle. Conventional optical targets 24, having black and white optical elements 26, are configured with one or more discrete identification marks to differentiate between front optical targets and rear optical targets when both are present in a field of view. Typically, the identification mark is close to adjacent optical elements 26 in the target 24, and when the optical target is imaged at a high incident angle, the identification mark appears to merge with adjacent optical elements.

Figure 9:
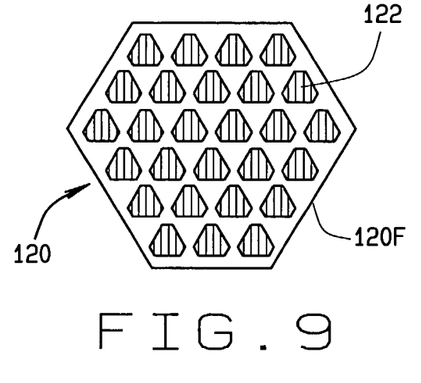
FIG. 9 is a representation of a front optical target of the present invention utilizing an identifying color.
Figure 10:
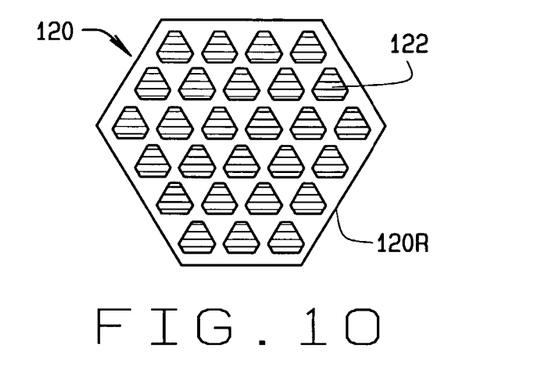
FIG. 10 is a representation of a rear optical target of the present invention utilizing an identifying color different from that shown in FIG. 9.

Utilizing color facilitates the discrimination between front optical targets 120F and rear optical targets 120R when they are imaged at high incident angles. As shown in FIG. 9 and FIG. 10, the optical elements 122 on the front optical target 120F are colored red, and the optical elements 122 on the rear optical target 120R are colored blue. To differentiate between the front and rear optical targets 120F, 120R in an image, the computer 14 may be configured with conventional color image processing software to utilize red color channel input from the color camera 112 to identify the front optical targets 120F. Little or no light reflected from the blue optical elements 122 of the rear optical targets 120R will be present in the red color channel input.

Correspondingly, to identify the rear optical targets 120R, the computer 14 may be similarly configured to utilize blue color channel input from the color camera 112. Little or no reflected light from the red optical elements 122 of the front optical targets 120F would be present in the blue color channel input. By utilizing only data associated with select colors in a color image, identification of individually colored optical targets 120 in the field of view of a color camera 112 is facilitated, eliminating the need in a conventional optical imaging wheel alignment system to identify individual optical targets 24 by the use of discrete identification marks.

Those of ordinary skill in the art will readily recognize that the concept of colored target elements may be expanded beyond the colors red and blue, to include any combination of colors which are uniquely identifiable in a color image. To identify a colored optical target 120 in an image, the computer 14 is configured with conventional color image processing software to utilize color data from each input color channel. Further, it will be recognized by those of ordinary skill in the art that if there is a need to identify the colored optical targets 120 on the left side of a vehicle from the color optical targets 120 on the right side of a vehicle, each individual color optical targets 120 may include optical elements 122 having unique colors. Such a variation is particularly well suited for improving a wheel alignment system 10 with a single color camera 112 having a field of view capable of covering both sides of a vehicle.

White balance commonly refers to a system of color correction used to compensate for varied illumination conditions. Although light looks "white" or "clear," to a human observer, it is actually made up of different colors. Different illumination sources are more concentrated in a certain color of light. For example, midday sun tends to give off more blue hue light while a sunset tends to give off more red hue light due to the atmosphere acting as a filter as the angle the sunlight hitting the atmosphere changes. Human eyes adjust to this automatically, and most human observers will not notice much difference. A color camera 112, however, will record the difference. A midday scene will be recorded with a blue hue if no adjustment is made to the color balance. Artificial illumination can similarly have a particularly strong color. Tungsten lights, have a distinct red hue. Fluorescent lights have a more greenish or bluish hue. Since the colors present on an optical target 120 of the present invention are predetermined, both the exposure of the image and the white balance of the image can be adjusted using conventional color correction techniques. This can be facilitated by providing a pure white object in the color target 120 so that post processing can be done by the computer 14 on the target image to adjust for illumination conditions. For example, each optical element 122 of the color target 120 may be disposed on a background of pure white or pure black.

Those of ordinary skill in the art will recognize that the background on the color target 120, on which each optical element 122 is set, may have a color which is distinct from the colors of each of the optical elements 122 disposed thereon, or may have either a white tone or a black tone.

In an alternate embodiment of the present invention, color is utilized as a means to facilitate a calibration or characterizing step for each individual color optical target 120 prior to use. In conventional optical vehicle wheel alignment systems 10, such as shown in U.S. Pat. No. 5,675,515 to January, it is possible to perform a calibrating or characterizing step for each individual optical target 24 in order to reduce measurement errors and to accommodate for known or measured deviations from an ideal optical target. These known or measured deviations may, for example, be planar deviations. To utilize calibration factors, the wheel alignment system 10 must have a way of identifying an individual optical target 24 in an image. Using a unique color for all optical elements 122 on a color optical target 120, or for a selected group of optical elements 122 on a color optical target 120 permits each color optical target 120 to be uniquely identified in a color image by the computer 14, as described above, so that the correct calibration factor can be applied.

In an alternate embodiment of the present invention, color is utilized as a means to facilitate optical target pre-compensation procedures. Conventional optical vehicle wheel alignment systems 10, such as shown in U.S. Pat. No. 5,675,515 to January, utilize a procedure called target pre-compensation. The optical targets 24 are each individually compensated by rotating the mounting shaft 29 of the optical target 24 within a supporting structure of a mounting adaptor (not shown). This determines an axis of rotation for the target shaft 29 with respect to a face 25 of the optical target 24, and a corresponding compensation value. This procedure only needs to be performed once, when the optical target 24 is mounted to the mounting adapter. For the wheel alignment system 10 to obtain correct measurements using the obtained compensation values, each optical target 24 must remain mounted to the same mounting adaptor and be used at the same wheel location for each vehicle.

Using a unique color for all optical elements 122 on a color optical target 120, or for a select group of optical elements 122 on a color optical target 120 permits each color optical target 120 to be uniquely identified by the computer 14 in a color image, as described above. In the event a pre-compensated color optical target 120 is mounted at a wheel location other than that for which it was compensated, the computer 14 is configured to provide the operator with a suitable warning.

In an alternate embodiment of the present invention, color is utilized by the computer 14 as a means to determine the orientation of a color optical target 120A. The arrangement of optical elements 26 on a optical target 24, such as shown in U.S. Pat. No. 6,064,750 to January is symmetrical, and provides no reference information identifying an absolute orientation of the optical target 24. Currently, vehicle wheel alignment systems 10 are configured to assume an initial optical target orientation when performing image processing based on the known configuration of the camera 22 and the specific vehicle wheel alignment procedures which are being performed.

Figure 11:
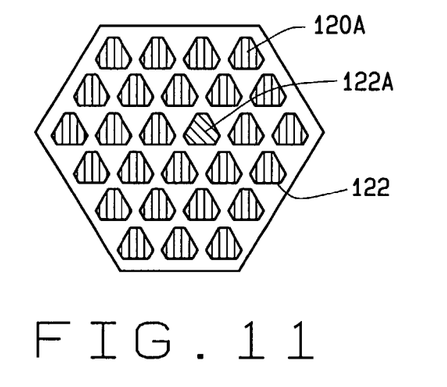
FIG. 11 is an alternate embodiment of the optical target of the present invention, with one target element having a different color from the remaining target elements.

As shown in FIG. 11, providing one or more color optical elements 122A in a color optical target 120A with a unique color provides one or more reference points in a color image, from which an absolute orientation of the color optical target 120A can be determined by the computer 14 configured with conventional color image processing software.

Figure 12:
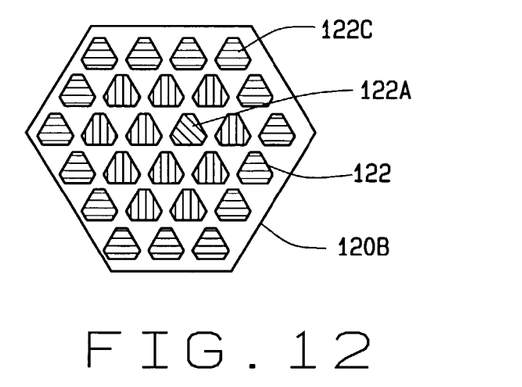
FIG. 12 is a representation of an alternate embodiment of the optical target of the present invention.

In an alternate embodiment of the present invention, color is utilized as a means to assist the computer 14 to find a color optical target 120B in a color image obtained from the color camera 112. Current target designs 24, such as shown in U.S. Pat. No. 6,064,750 to January, utilize a known target border or ring element 31 to aid in the identification of an optical target 24 in an image of the camera field of view. These designs provide an identifying geometric characteristic which the computer 14 is capable of recognizing in an image. As shown in FIG. 12, by providing optical elements 122C located about a perimeter of the color optical target 120B with a distinct color, the conventional target border or ring element can be eliminated. The computer 14 is configured with software to process a color image obtained by the color camera 112 and to identify color regions in the image corresponding to the distinct color. These regions are quickly identified as possible images of the color optical target 120B, and further analyzed using conventional target recognition software.

An additional advantage of this embodiment of the present invention is that it facilitates recognition of a partially obscured color optical target 120B in a color camera field of view. One or more of the distinctly colored optical elements 122C of a partially obscured color optical target 120B will likely be visible in the color camera field of view. As such, the computer 14 is configured to identify the visible region having the distinct color as a portion of a color optical target 120B. Previously, if the conventional target border or ring element 31 was partially obscured in an image, the identifying geometric characteristic of a closed shape was altered, rendering recognition by the computer 14 difficult or impossible.

Replacement of the conventional target border or ring element 31 with distinctly colored optical elements 122C permits a reduction in the overall size of the color optical target 120B, and further permits useful images of the color optical target 120B to be obtained at high incident angles of observation. During some vehicle wheel alignment procedures, it is required that the vehicle's steerable wheels be rotated from a straight-ahead position. With conventional optical targets 24, the target border or ring element 31 appears to blend with the edge of other optical target elements at high incident angles, obscuring necessary target data points from the image. Replacing the target border or ring element 31 with colored optical elements 122C permits the computer 14 to distinguish between the distinctly colored optical elements 122C serving a dual roll of identifying the target and providing target data points and regular color optical elements 122 in a image obtained at a high incident angle.

In an alternate embodiment of the present invention, color is utilized as a means to provide an increased number of target reference points for a given target area. Conventional optical targets, shown in FIG. 6 and in U.S. Pat. No. 6,064,750 to January, employ triangular optical elements 26. Each optical element 26 in the target 24 of the '750 January patent provides at least 3 target reference points 33, i.e. the intersecting points for each side of the triangular optical elements. In a second conventional target design, shown in U.S. Pat. No. 5,535,522 to Jackson, circular optical elements are employed. Circular optical elements provide fewer target reference points 33, for example, the centroid of each optical element.

With the present invention, a distinct color may be utilized to provide one or more patterns of color optical elements 122 within the overall collection of color optical elements 122 present on a color optical target 120B. For example, distinctly colored optical elements 122 may be disposed on a color optical target 120B in a triangular pattern with the overall collection of color optical elements 122. This "pattern within a pattern" provides additional target reference points 33, i.e. the vertex points of the pattern itself, which are determinable within a color image obtained from a color camera 112.

Figure 13A:
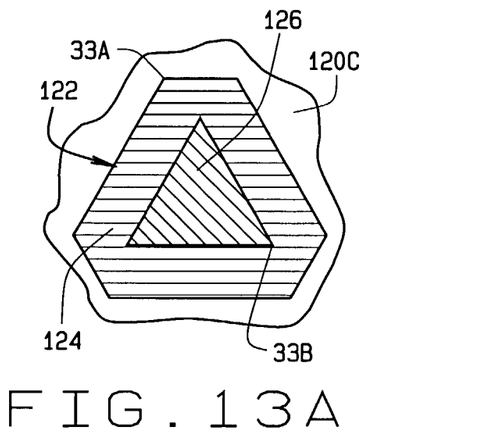
FIGS. 13A-13C are exemplary representations of optical target elements composed of two or more colored regions.
Figure 13B:
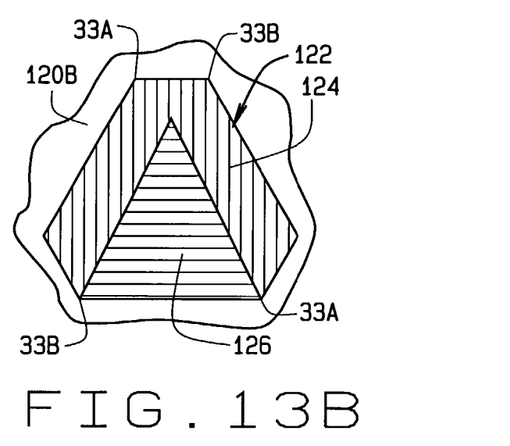
Figure 13C:
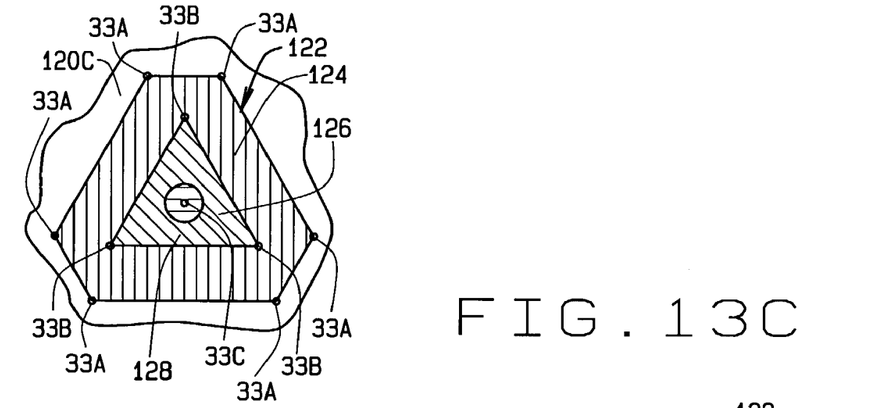

Alternatively, as shown below in FIG. 13A through FIG. 13C, the outer portion 124 of one or more individual color optical elements 122 of a color optical target 120C is provided with a first color (i.e. red), and an inner portion 126 is provided with a second color (i.e. green). Optionally, a third portion 128 with a third color (blue) is provided at the center of the optical element. Using triangular color optical elements 122, such as shown in FIG. 13A and FIG. 13B, a first set of target reference points 33A are provided by each outer portion 124, and a second set of target reference points 33B are provided by each second portion 126, and a third set of target reference points 33C are provided by each third portion 128. The target reference points 33A, 33B, or 33C may consist of straight edges defined by each portion of the color optical elements 122, vertices, centroids, or other geometric characteristics, such as described in U.S. Pat. No. 6,064,750 to January et al. With each color optical element 122 providing one or more sets of target reference points 33 for the computer 14, stable and accurate measurements may be obtained from a reduced number of color optical elements 122 on a color optical target 120C.

Figure 14A:
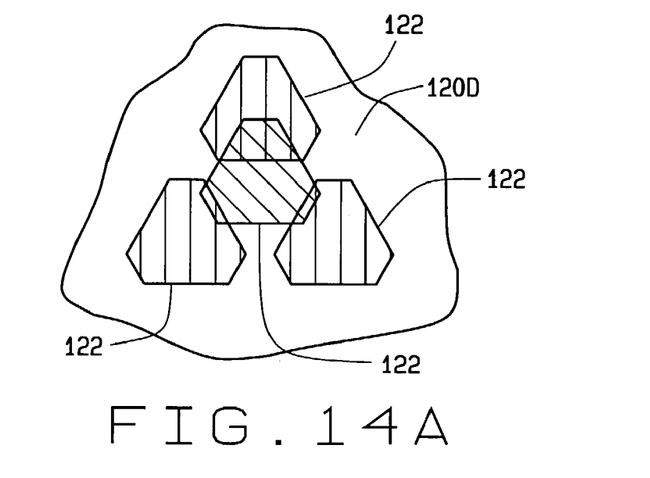
FIGS. 14A-14B illustrate the overlapping addition of multiple optical target elements of different colors onto an optical target to increase target points.
Figure 14B:
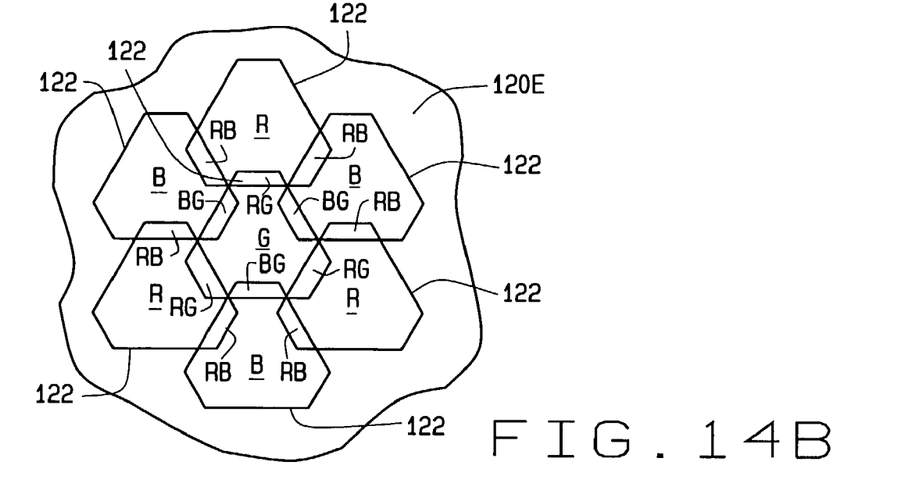

An alternative configuration for the color optical target 120D utilized to increase the number of target reference points 33 is to provide overlapping colored optical elements 122, as shown in FIGS. 14A and 14B. As shown in FIG. 14A, two different colored optical elements 122 are partially overlapped on the color optical target 120D thereby increasing the number of target reference points 33 in a given area on the color optical target 120. Similarly, in FIG. 14B, three different colored optical elements 122 are partially overlapped on the color optical target 120E, further increasing the number of target reference points 33 for the same given area as shown in FIG. 14A.

The overlapping portions of the colored optical elements 122 assume distinct colors defined by the colors associated with the colored optical elements 122 overlapping at that location. It is preferred that no portion of any color optical element 122 overlap more than one additional color optical element 122 of a different color. Overlapping portions of red optical elements (R), green optical elements (G), and blue optical elements (B), as shown in FIG. 14B, combine to produce overlap regions having a red-green color, a red-blue color, and a blue green color. Each overlap region is detectable by the computer 14 in at least two of the color channels input from the color camera 112. By processing each color channel separately, the computer 14 is configured to identify an incrementally greater number of target reference points 33 on a color target 120E having overlapping color optical elements 122.

Those of ordinary skill in the art will recognize that the colored optical elements need not be limited to triangularly shaped optical elements as shown in FIGS. 9 through 14B, and that the same techniques described herein could be used with other geometrically shaped optical target elements (i.e. colored polygons, squares, circles, ellipses, hexagons, etc.) For example, as shown in FIG. 19, an optical target 120 may include a plurality of differently colored circular optical elements 122C1-122C5. These colored circular optical target elements may optionally be disposed in a predetermined arrangement about a common center point 123, or may optionally be overlaid, as shown with colored circular optical elements 122C4 and 122C5. By overlaying two or more colored circular optical target elements having a common center or centroid, multiple measurements of the location of the common center or centroid may be obtained by processing each colored circular optical target individually.

An advantage of using color to positively identify an optical target in the field of view of a color camera 112, coupled with one or more of the alternate embodiments shown above (more reference points, etc.) may permit ambient illumination of the color optical targets 120 in some environments. The use of ambient illumination of the color optical targets 120 eliminates the need for conventional optical emitters to illuminate the optical targets and/or eliminate the use of retro-reflective targets surfaces, thus lowering production cost and complexity. If ambient illumination of an optical target is not sufficient for the color camera 112 to obtain an image of the color optical target 120 having sufficient saturation and/or contrast, the computer 14 may optionally be configured to provide the operator with a warning to increase the ambient light (i.e. turn on the lights in the room).

Those of ordinary skill in the art will recognize that the various embodiments of the color optical targets 120 need not be limited to planar or two-dimensional targets, but rather, may include three-dimensional target structures. For example, an alternate embodiment of the color optical target 120 may consist of a multi-faceted object, such as a cube, with each facet of the object identified by a different color. Images of the multi-faceted object obtained by the color camera 112 may be analyzed to identify ratios of visible colored facets, and correspondingly, to identify a spatial orientation of the target object.

An alternative embodiment of a color optical target 120 may supplement or replace the discrete optical elements 122 by providing the target surface 25 with a layer of color-shifting material. Color-shifting material includes a range of materials, such as paints and inks, which appear to change color as a function of the angle at which the color-shifting material is viewed. This is accomplished using light interfering pigments such as shown in U.S. Pat. No. 6,243,204 to Bradley et al. An exemplary color-shifting material is manufactured under the trademark CHROMAFLAIR by Flex Products, Inc. of Santa Clara, Calif. The use of color-shifting materials on a color optical target 120 provides an additional source of angle measurement information in a color image of the color optical target 120, and is particularly advantageous for high view angle of incidence applications.

An alternative embodiment of a color optical target 120 may supplement or replace the discrete optical elements 122 by providing the target surface 25 with a diffraction grating or hologram configured to create an apparent color change when the color optical target 120 is viewed at different angles by the color camera 112.

Figure 15A:
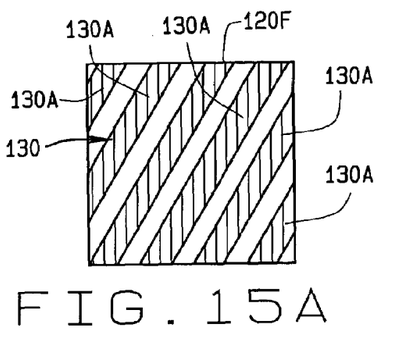
FIGS. 15A-15C illustrate the alignment of individual color stripes on an alternate optical target of the present invention.
Figure 15B:
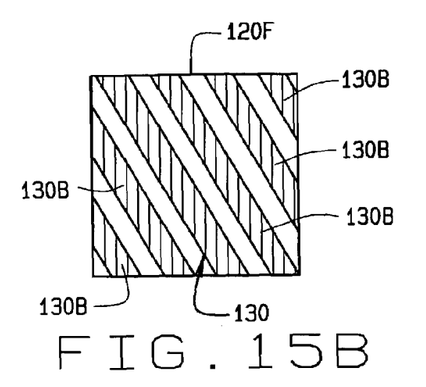

In an alternate embodiment of the present invention, a color optical target 120 is configured with a plurality of overlaid color stripes 130. Preferably, three color stripes 130 are utilized, each of a different color, i.e. red stripes 130A, blue stripes, 130B, and green stripes 130C. Preferably stripes of a common color are disposed parallel to each other, and at a 120 degree orientation relative to stripes of a different color, as shown in FIG. 15A through FIG. 15B. When the stripes are overlaid on a target face 25, the combined colors produce a repeating pattern of hexagonal optical elements, each composed of six equal portions, with each portion having a unique color which is determined by the overlaid stripes 130 in that portion. With this configuration of the color optical target 120, those of ordinary skill in the art will recognize that the target colors must be carefully chosen to avoid mutual interference, based on the color response curves of the color camera 112. To keep the three overlapping colors from interfering with each other, it is preferred that three monochromatic light sources corresponding to the selected colors are utilized to provide suitable illumination of the color optical target 120.

Figure 15C:
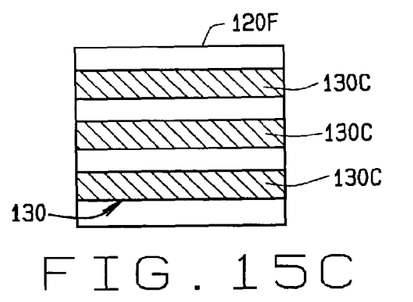
Figure 16A:
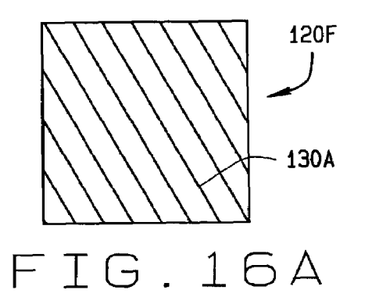
FIGS. 16A-16C illustrate the edges of said striped optical elements and determinable reference points in an optical target of the present invention.
Figures 16B, 16C, 17:
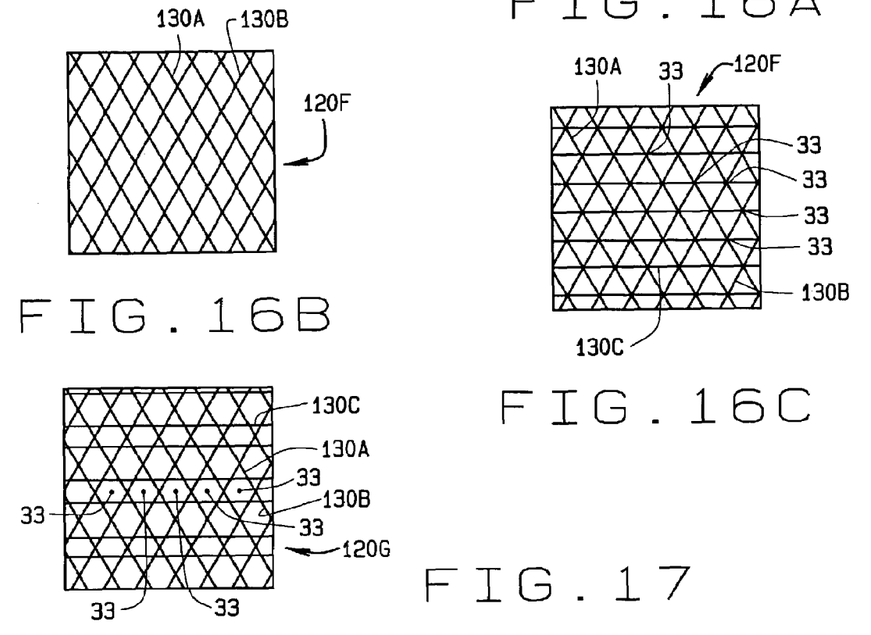
FIG. 17 illustrates an alternate embodiment optical target of the present invention configured with shifted color stripes.
Figure 18:
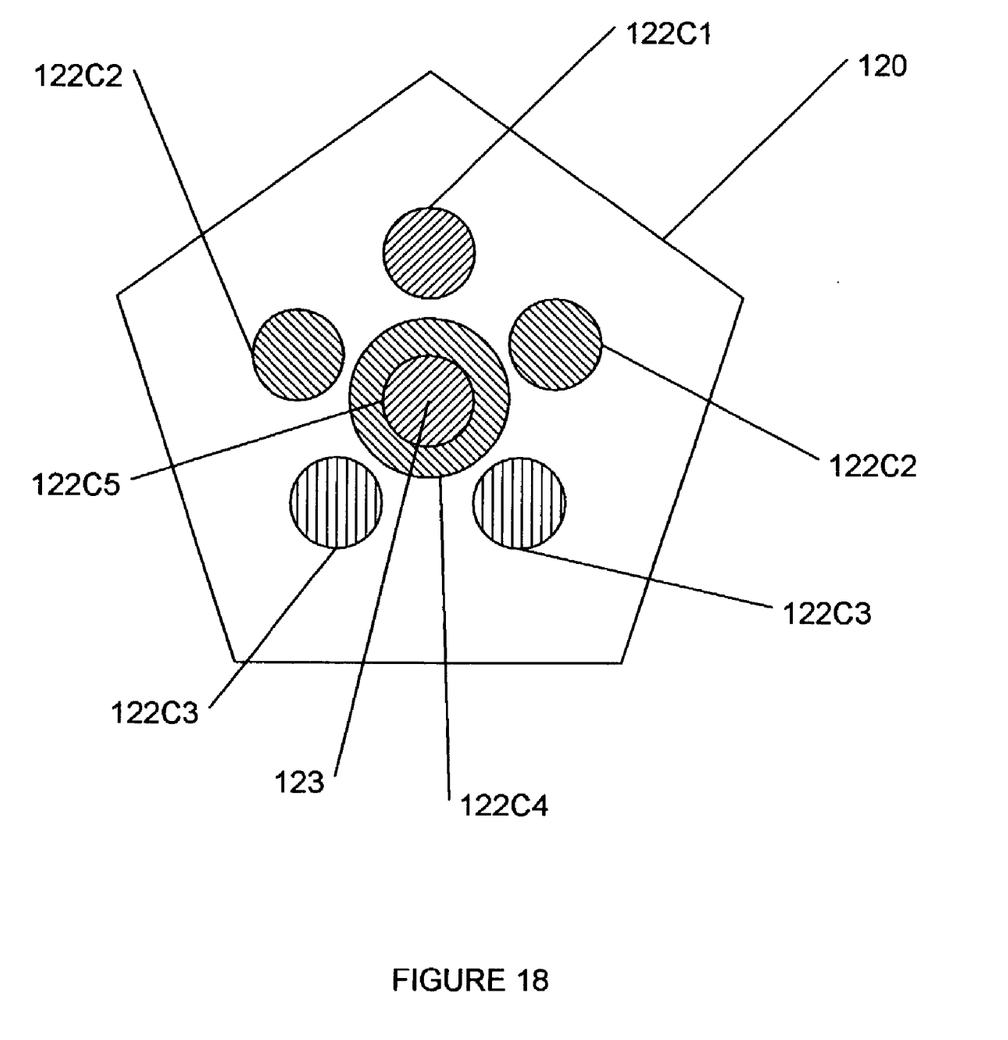
FIG. 18 illustrates an alternate embodiment optical target of the present invention configured with colored circular optical target elements.

FIG. 16A through FIG. 16C illustrates the target reference points and lines which can be identified by the computer 14 from a color image of a color optical target 120 consisting of overlaid color stripes 130, as shown in FIGS. 15A through 15C. Input from a first color channel of the color camera 112 provides the computer 14 with image of one set of color stripes 130A, the edges of which can be identified with a conventional curve-fit software algorithm. These edges are shown in FIG. 16A. Input from a second color channel of the color camera 112 provides the computer 14 with an image of a second set of color stripes, 130B. The edges of the second set of stripes can be identified with a conventional curve-fit software algorithm, and overlaid with the identified edges from the first set of color stripes 130A. The combined edge information for two sets of color stripes is shown in FIG. 16B. Input from a third color channel of the color camera 112 provides the computer 14 with an image of a third set of color stripes, 130C. The edges of the third set of stripes can be identified with a conventional curve-fit software algorithm, and overlaid with the identified edges from the first two sets of color stripes 130A and 130B. The combined edge information for three sets of color stripes is shown in FIG. 16C. This produces a dense grid of target reference points 33. These points can then be used by the computer 14 to determine the location of the target in three-dimensional space using conventional software algorithms.

In an alternative embodiment of the color optical target 120G, one set of stripes 130C is shifted so that the center lines of intersecting stripes from each set of stripes 130A, 130B, and 130C intersect at a common point, as shown in FIG. 17. Using this embodiment, target reference points 33 can be calculated by the computer 14 in a redundant, lighting-invariant manner. Initially, the computer 14 identifies the edges of each stripe 130 using conventional continuous line equations. Next, the computer 14 identifies the points of intersection between the edges of two stripes to produce a set of intersection points. Finally, to identify each three-stripe intersection point, the computer 14 locates the six nearest two-stripe intersection point, and calculates central target reference points by averaging their positions. Local corrections may be required for perspective or other distortions of the optical system for maximum accuracy.

An advantage to using a color target 120G is that the method for calculating central target reference points is immune to variations in lighting. Since the two-stripe edge intersection points always occur in symmetrical pairs around the central target reference points, the central target reference points are independent of any apparent variations in the width of each intersecting stripe 130. This holds true even when the spectrum of the light source shifts.

An alternate embodiment of color target 120G includes only two sets of stripes 130, each set having a different color. The two sets of stripes 130 are disposed on the color target 120G perpendicular to each other, such that the intersecting edges of each stripe provide four intersection points about each central target reference point. The advantage of illumination lighting invariance is preserved, and calculation of each central target reference point require less computation time by the computer 14. An additional advantage to using only two sets of stripes 130 is that the colors of each set of stripes may be selected to be farther from each other in the spectrum, thereby reducing mutual color interference when imaged through a color camera 112.

In an alternate embodiment of the present invention, colored structured light may be used to illuminate an object such as a vehicle wheel or a target structure attached to the vehicle wheel from several sources simultaneously. Each illuminating color is projected to the vehicle wheel or target structure from a different direction. The computer 14 can generate a profile of the vehicle wheel or target structure from at least one image containing the reflection of at least one of the colored structured light sources impinging at least a part of the vehicle wheel or target structure. The image is obtained from at least one color camera 112 disposed to view the vehicle wheel or target structure. The multiple colored structured light sources increase the density of the data points defining the profile and increase the accuracy without requiring separate images to be obtained for each light source angle. The computer 14 is configured with software to determine one or more vehicle wheel alignment angles from the profile of the imaged vehicle wheel or target structure.

In an alternate embodiment of the present invention, Moiré patterns are generated on the surface of an object such as a vehicle wheel or target based on different colors. Each color in the Moiré pattern represents a different basic angle such as roll, pitch or yaw, permitting color images of the patterns obtained by a color camera 112 to be processed by the computer 14 to obtain specific wheel alignment angle measurements. The computer 14 is configured to resolve each basic angle from a combination of each color present in the imaged Moiré reference pattern.

In an alternate embodiment, color optical targets 120 are produced by covering a retro-reflective backing layer with a layer of color bandpass filter film. The resulting color optical target 120 retains the high light gain of retro-reflective material, and can be selectively illuminated by controlling the spectral output of an illuminating light source. This embodiment can be used to color-identify optical targets in a vehicle wheel alignment system configured with one or more grayscale or monochrome cameras, by selectively illuminating the optical targets 120 from multiple monochromatic light sources.

An alternative embodiment of the optical imaging vehicle wheel alignment system 100 of the present invention does not utilize removable optical targets 120 associated with the wheels or components of a vehicle. Rather, the alternate embodiment provides color reference marks directly on the surface of the vehicle wheels or vehicle components. The color reference marks are observed by a color camera 112, which generates one or more color images thereof. The color images are processed by the computer 14 to identify one or more vehicle wheel alignment measurements. Optionally, the color reference marks are provided by a fluorescent material which is substantially invisible to the unaided human eye until illuminated by an ultraviolet illumination source. Upon illumination by an ultraviolet illumination source, the color reference mark fluoresces, and an image thereof may be obtained using the color camera 112.

Those of ordinary skill in the art will recognize that for each of the above-described embodiments of the present invention, the computer 14 is configured with conventional color image processing software capable of extracting color information from a color image. The computer 14 is further configured with software to identify and select relevant color information associated with a color optical target 120, and to provide the selected relevant color information to a conventional optical target image processing software component for processing, such as described in U.S. Pat. No. 6,064,750 to January, to identify a position and orientation of the color optical target 120 in three-dimensional space.

As a method, the present invention provides an improvement upon the method of measuring one or more vehicle wheel alignment angles by processing a grayscale or monochromatic images of an optical target associated with a vehicle wheel. The method of the present invention for measuring one or more alignment angles of a vehicle wheel consists of initially mounting at least one optical target in an operative relationship to a wheel of a motor vehicle. Next, one or more color images of the field of view including the optical target are obtained through a color camera, with each color image including at least two distinct colors. The optical target is identified in the color images of the field of view, and the position and orientation of said identified optical target is identified. Finally, from the identified position and orientation of the optical target an alignment measurement of the vehicle is determined.

In an alternative method, at least one distinct color present in the optical target is identified in the color image of the field of view of the color camera. The distinct color is utilized to identify a region of the color image within which an image of the optical target is present.

In an alternative method, at least one distinct color present in the optical target is identified in a color image of the optical target obtained by a color camera. The distinct color is processed to identify one or more target reference points, which are subsequently utilized to determine a position and orientation of the color optical target in three dimensional space.

Portions of the present invention can be embodied in the form of computer-implemented processes and apparatuses for practicing those processes. Portions of the present invention can also be embodied in the form of computer program code containing instructions embodied in tangible media, such as floppy diskettes, CD-ROMs, hard drives, or other computer readable storage medium, wherein, when the computer program code is loaded into an executed by a computer, the computer becomes an apparatus for practicing the invention.

Portions of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A vehicle wheel alignment apparatus for determining the alignment of one or more wheels of a vehicle, said apparatus comprising:
   at least one optical target including at least one color reference mark disposed on a surface of a vehicle wheel assembly;
   at least one camera disposed to generate at least one color image of said at least one optical target, said camera configured with an imaging element sensitive to detect a plurality of colors;
   a computer operatively connected to said at least one camera, said computer configured to receive and process said at least one color image of said optical target to determine one or more optical target parameters; and
   said computer configured to utilize said one or more optical target parameters to calculate one or more vehicle wheel alignment angles associated with said vehicle wheel assembly.

2. The vehicle wheel alignment apparatus of claim 1 wherein said computer is configured to receive pixel data representative of said at least one color image, said pixel data including two or more color channels; said computer further configured to process pixel data associated with at least one of said two or more color channels to determine one or more optical target parameters.

3. The vehicle wheel alignment apparatus of claim 1 where said at least one camera is further configured to generate said at least one color image of said at least one optical target when said optical target is illuminated predominately by ambient light.

4. The vehicle wheel alignment apparatus of claim 1 wherein each of said optical targets is identified by a different color reference mark.

5. The vehicle wheel alignment apparatus of claim 4 wherein said color optical reference mark is configured to provide target orientation information.

6. A method for determining the alignment of one or more wheels of a motor vehicle, comprising the steps of:
   projecting at least one color optical target onto a wheel assembly of said motor vehicle;
   obtaining at least one color image of a field of view including said at least one optical target, said at least one color image composed of a plurality of color channels, each color channel including data representative of an observed color level at each pixel location for said corresponding color;
   identifying said at least one optical target in said at least one color image utilizing at least one color channel;
   calculating a position and orientation of said identified optical target in said field of view utilizing at least one color channel; and
   determining an alignment of said wheel assembly of said motor vehicle based upon said observed position and orientation of said identified optical target.

7. The method of claim 6 for determining the alignment of one or more wheels of a motor vehicle wherein the step of calculating a position and orientation of said identified optical target in said field of view further includes obtained at least one set of target reference points from each of said plurality of color channels.

* * * * *